United States Patent
Pearce et al.

(10) Patent No.: US 8,139,442 B2
(45) Date of Patent: Mar. 20, 2012

(54) ROBUST UNDERWATER COMMUNICATION SYSTEM

(75) Inventors: Christopher D. Pearce, Hook (GB); Richard J. Smith, Fleet Hampshire (GB); Roger Sydney Dudley Smith, legal representative, Malvern Worcester (GB); Judith Jane Smith, legal representative, Malvern Worcester (GB)

(73) Assignee: Sonardyne International Ltd., Yateley, Hampshire (GB)

( * ) Notice: Subject to any disclaimer, the term of this patent is extended or adjusted under 35 U.S.C. 154(b) by 737 days.

(21) Appl. No.: 11/570,422

(22) PCT Filed: May 3, 2005

(86) PCT No.: PCT/GB2005/001668
§ 371 (c)(1),
(2), (4) Date: Jan. 16, 2008

(87) PCT Pub. No.: WO2005/122446
PCT Pub. Date: Dec. 22, 2005

(65) Prior Publication Data
US 2011/0096632 A1    Apr. 28, 2011

(30) Foreign Application Priority Data
Jun. 12, 2004 (GB) .................... 0413137.1

(51) Int. Cl.
*H04B 11/00* (2006.01)
(52) U.S. Cl. ........................ 367/134
(58) Field of Classification Search .............. 367/134
See application file for complete search history.

(56) References Cited

U.S. PATENT DOCUMENTS
3,893,062 A  *  7/1975 Segui ..................... 367/134
(Continued)

FOREIGN PATENT DOCUMENTS
EP       0185120    * 10/2007
(Continued)

OTHER PUBLICATIONS

Kebkal K Get al: "Implementation of a sweep-spread function for communication over underwater acoustic channels" Oceans 2000 MTS/IEEE Conference and Exhibition Sep. 11-14, 2000, Piscataway, NJ, USA,IEEE, vol. 3, Sep. 11, 2000, pp. 1829-1838, XP010521140 ISBN: 0-7803-6551-8.*

(Continued)

*Primary Examiner* — Daniel Pihulic
(74) *Attorney, Agent, or Firm* — Bracewll & Giuliani LLP

(57) ABSTRACT

A robust underwater communication system, for communication between an acoustic signal transmitter and a remotely positioned acoustic signal receiver, wherein transmitted data is carried by a plurality of symbols each having two components one of which comprises a distinctive bit code and the other of which appertains to the character of the symbol as a whole wherein the character of successive symbols is stepped through a predetermined continuously repeating sequence of distinctive steps each of which occurs once in the sequence, the signal receiver being operated synchronously with the signal transmitter and comprising a correlator arrangement responsive both to the bit code and to the character of received signals for effecting demodulation and having a plurality of outputs one for each symbol, so that as each symbol is detected a signal on the output to which it corresponds predominates and amplitude detector means responsive to the outputs from the correlator arrangement for providing an output signal corresponding to the data transmitted.

13 Claims, 2 Drawing Sheets

U.S. PATENT DOCUMENTS

Figure 1:
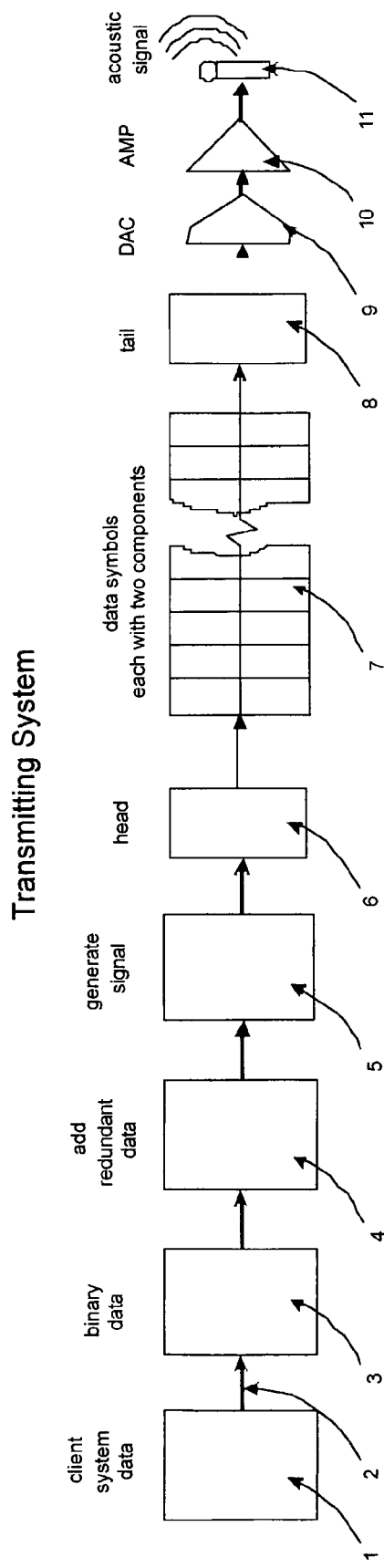

| | | | | |
|---|---|---|---|---|
| 4,335,452 A * | 6/1982 | Eberlin et al. | | 367/134 |
| 4,951,263 A * | 8/1990 | Shope | | 367/134 |
| 5,018,114 A * | 5/1991 | Mackelburg et al. | | 367/134 |
| 5,784,339 A * | 7/1998 | Woodsum et al. | | 367/134 |
| 2003/0022651 A1* | 1/2003 | Bannasch et al. | | 455/307 |

FOREIGN PATENT DOCUMENTS

| | | | |
|---|---|---|---|
| GB | 2056727 | * | 3/1981 |
| WO | WO/2005/122446 | * | 12/2005 |

OTHER PUBLICATIONS

Tongfeng et al: "Frequency hopping underwater data communication system's synchronization processing" Communications, Circuits and Systems and West Sino Expositions, IEEE 2002 International Conference on Jun. 29-Jul. 1, 2002, Piscataway, NJ, USA,IEEE, vol. 1, Jun. 29, 2002, pp. 277-281, XP010632263 ISBN: 0-7803-7647-6.*

* cited by examiner

ROBUST UNDERWATER COMMUNICATION SYSTEM

This invention relates to underwater communication systems.

More especially but not exclusively it relates to robust underwater communication systems, which facilitate positioning and/or navigation in or under water. Typically such systems are used in the offshore oil and gas industry for positioning various kinds of object such as work vessels on the surface, and vehicles or structures in the water column or on the sea bed. In addition, these systems may carry command and control signals or other data from object to object. Such systems may also find application in the naval field for communication with sub-sea vessels/vehicles.

The most practical means of distance measurement, bearing measurement, velocity measurement and communicating underwater is by using ultra-sound or acoustic signals. Modern systems are often highly integrated with inertial/attitude sensors and above surface radio navigation positioning systems such as the Global Positioning System (GPS). However, in practice, the underwater part of these systems uses acoustic signaling.

In these systems there are several, sometimes conflicting requirements for data communication. For example in the case of a command, control and navigation system requirement relatively small volumes of data must be delivered reliably, securely and with minimum latency in a wide range of conditions and in the case of a sub-sea recording instrument large volumes of data, typically in file structures, should be retrievable using a minimum of ship time.

It is generally recognised that high performance communication underwater is more difficult than in equivalent systems using radio signals. This is due to the presence of high acoustic noise levels in and around the working environment as well as other problems due to aeration, multi-path effects, volume reverberation, and limited frequency bandwidth, which may very well give rise to poor wanted signal to noise power ratios. Additionally motion of the transmitter with respect to the receiver may also give rise to problems.

Considering these problems in a little more detail, multiple signal paths (multi-path effects) result from the reflections of signals from the water surface, from the seabed and from other underwater boundaries such as a ship's hull for example. Also due to temperature variation with depth, the sea may not be homogeneous but appear to have a layered structure that refracts sound and may also cause multi-path effects. The overall effect may be that at any instant a received signal comprises the sum of several different versions of the signal arriving in several different paths.

In communication systems different signals represent different symbols that in turn represent different data sequences and thus a major problem with underwater communications is inter-symbol interference. The problem can be avoided by using symbols with long time duration but this limits the data rate, which is an important performance parameter. Another technique is to use time or frequency domain "equalisation" to order the data and thereby to remove a significant amount of interference. Most known embodiments use a pre-amble sequence of known data for training purposes which is complex and requires a minimum time period to transfer any data which makes the method more suitable for the transfer of large volumes of data typically in file structures.

Complexity can however be something of a problem in underwater systems because underwater navigation beacons and most other sub-sea instrumentation is battery powered, and there is a direct roughly proportional relationship between system complexity and energy consumed. Thus undue complexity is generally to be avoided to reduce the time between battery changes.

Additionally the performance of a communications system depends upon frequency bandwidth as well as wanted signal power to noise ratio at the receiver. In water, sound absorption increases with frequency and as a result any system with a practical range capability, particularly in a noisy environment, has a limited bandwidth compared with radio systems. Efficient use of bandwidth is thus another desirable requirement.

In conventional narrowband systems, intra-symbol interference, i.e. alternate constructive and destructive interference causes fluctuations in signal amplitude and power. The effect is commonly referred to as fading which may be mitigated by using wideband signals.

It is an object of the present invention to provide an underwater communication system wherein the foregoing problems are mitigated at least in part thereby to provide a system which is not unduly complex and yet capable of efficient operation in difficult working conditions.

According to the present invention an underwater communication system is provided, for communication between an acoustic signal transmitter and a remotely positioned acoustic signal receiver, wherein transmitted data is carried by a plurality of symbols having two components one of which comprises a distinctive bit code and the other of which appertains to the character of the symbol as a whole wherein the character of successive symbols is changed through a predetermined continuously repeating sequence of distinctive steps, each of which occurs once in the sequence, the signal receiver being operated synchronously with the signal transmitter and comprising correlator means responsive both to the bit code and to the character of received signals and having an output, one for each symbol, so that when a symbol is received, a signal on the output to which it corresponds predominates and amplitude detector means responsive to the outputs from the correlators for providing an output signal corresponding to the data transmitted.

By changing not only the bit code of each symbol but also the character of successive symbols in accordance with a predetermined sequence and synchronising operation of the transmitter and receiver, detection of a wanted signal is facilitated in the presence of unwanted spurious signals and noise which might otherwise interfere with reception.

In particular the effect of spurious signals due to multi-path effects are substantially obviated because such signals will have died away by the time the sequence is repeated and preferably the sequence used comprises several step changes so that it does not repeat until sufficient time has elapsed for any significant multi-path component of its previous occurrence to decay substantially to insignificance.

The bit code which comprises the first component of each symbol may be transmitted using phase shift keying (PSK) and the character of each symbol may be changed from symbol to symbol by hopping the carrier frequency on which it is transmitted through the said predetermined continuously repeating stepped sequence.

The transmitter may comprise PSK modulator means, and means for hopping the frequency carrier carrying the signal thus modulated, the receiver comprising frequency/phase detector means for detecting both components of the received signal which detector means is arranged to feed a correlator to which the amplitude detector is responsive for providing an output signal corresponding to the data transmitted.

The frequency/phase detector means may comprise a phase quadrature detector.

The correlator of the receiver preferably employs optimal correlation processing of the signals and thus continuously generates replicas of all the possible signals at each epoch, i.e. signal period, in a bank of correlators, whereby signal/symbol decisions using the maximum likelihood principle are thereby facilitated.

Ideally the signals should have sufficient bandwidth to resolve paths in time as required for each application in view.

Synchronisation may be achieved using a wideband header signal.

A similar tail signal may be appended at the end of each sequence.

For short data packets and modest data rates, compensation for relative motion between the transmitter and receiver is not a necessity but for higher rates compensation may be achieved using time of arrival estimates of the head and the tail signal and comparing the time difference with the known "as transmitted" time difference, the comparison for compensation purposes being applied after signal detection.

Alternatively the relative motion compensation may be implemented using time of arrival estimates of each symbol and a Kalman filter method for optimal estimation of the time scale difference between the transmitter and the receiver.

It will be appreciated by those skilled in the art that systems according to the invention substantially resolve the problem of providing secure, reliable command and control links suitable for use in a wide range of operating conditions. Also compared with known systems, greater data rates are achievable with increased speed of operation of the whole system and in view of its simplicity, a relatively small power consumption implementation is possible, which in battery-powered instruments/apparatus is a desirable feature.

In particular this invention facilitates the transmission of modest sized data packets with a minimum of delay, with minimum impact on the navigation system, through a multi-path environment to a receiver located on a noisy work vessel or platform.

Figure 2:
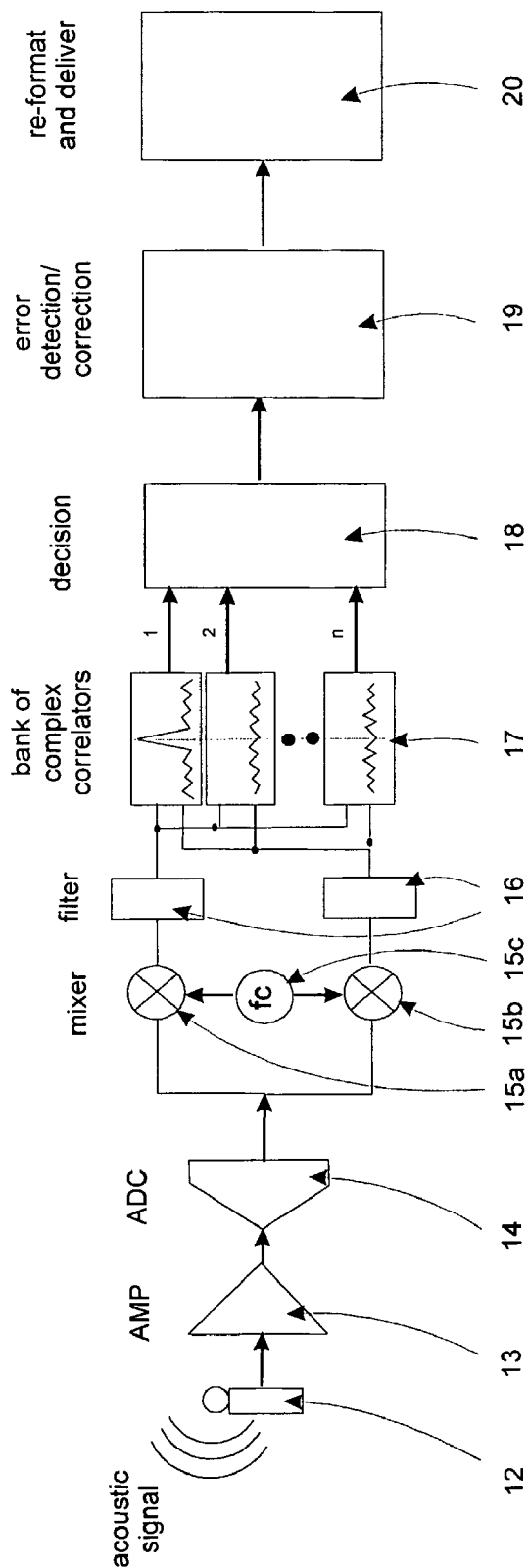

One embodiment of the invention will now be described by way of example only with reference to the accompanying drawings in which;

FIG. 1, is a schematic block circuit diagram of an acoustic signal transmitter and, FIG. 2, is a schematic block circuit diagram of an acoustic signal receiver for use with the transmitter of FIG. 1.

Referring now to FIG. 1, an acoustic signal transmitter comprises a data store 1, for data which is converted to a corresponding binary signal format in a binary converter 2, 3. In order to facilitate error correction at the receiver, which may be affected in any known manner, appropriate additional redundant data is added in a code generator 4, which is re-ordered to a format suitable for synthesis in a signal processor 5. The signal thus processed is further modified by the addition of header bits in an adder 6, which facilitates recognition in the receiver of the start of a sequence and synchronization of the transmitter and the receiver. Data comprises encoding n bits at a time using $2^n$=m symbols in a repeating sequence, which data bits are PSK modulated onto a carrier which is frequency hopped through the sequence in a modulator 7, utilising orthogonal carrier frequencies to produce a pseudo random sequence. A tail is appended in a processor 8, and the resultant signal is fed via a digital to analogue converter 9, and a power amplifier 10, the output of which is matched, to an acoustic signal transducer for transmission of the acoustic signal through the water to a receiver as shown in FIG. 2.

It will be appreciated that the carriers do not themselves carry any information but they are a means of mitigating multi-path signals at the receiver.

Turning now to FIG. 2, at the receiver, the analogue acoustic signal is received by a transducer 12, amplified in an amplifier 13, and converted to sampled digital format at a suitable rate in an A to D Converter 14. The digital signal thereby produced is mixed down to a convenient intermediate frequency in a phase quadrature detector, which comprises mixers 15a and 15b fed with signals in phase quadrature generated by a local oscillator 15c. Phase quadrature related signals from the mixers 15a, 15b, are decimated using filter 16 to another suitable rate. The decimated signal is fed to a bank of complex correlators comprising matched filters 17.

For each epoch in the signal sequence, the filters are matched to the head signal, the $2^n$ symbols or tail as appropriate. A symbol present decision is made in an amplitude detector 18, which is made on a maximum likelihood basis in dependence upon all outputs from the filters 17, the largest output being selected.

A resultant decoded data sequence is passed to an error detection/correction module 19 wherein the redundant data is used to detect transmission errors and if possible to correct them. The original data and an error report is formatted in a processor 20 and delivered therefrom in an appropriate format.

Various modifications may be made to the exemplary embodiment hereinbefore described without departing from the scope of the invention and for example the nature of two components may be defined using other techniques as will be well known to those skilled in the art. To give just one example, the first component comprising the data may comprise pulse code modulation and the second component defining the repeating sequence may comprise phase modulation. It will be appreciated that other suitable combinations of modulation for the two components are also possible.

The invention claimed is:

1. An underwater communication system, comprising:
   an acoustic signal transmitter; and
   a remotely positioned acoustic signal receiver: wherein
   the acoustic signal transmitter is arranged to transmit data encoded as a plurality of symbols, each symbol of the plurality of symbols having two components one of which comprises a distinctive bit code and the other of which appertains to the frequency of a carrier signal on which the symbol is transmitted: wherein
   the frequency of the carrier signal of successive symbols is arranged to be stepped through a predetermined continuously repeating sequence of distinctive steps each of which occurs once in the sequence: and
   the signal receiver is arranged to be operated synchronously with the signal Transmitter: and further comprising;
   a correlator unit arranged to be responsive both to the bit code and to the frequency of the carrier signal of received signals for effecting demodulation and having a plurality of outputs one for each symbol, so that as each symbol is detected a signal on the output to which it corresponds predominates; and
   an amplitude detector arranged to be responsive to the outputs from the correlators unit for providing an output signal corresponding to the data transmitted.

2. The underwater communication system of claim 1, wherein the sequence used comprises sufficient step changes for enough time to have elapsed to allow all significant multi-path components to decay to insignificance before it is repeated.

3. The underwater communication system of claim 1, wherein the bit code which comprises the first component of each symbol is arranged to be transmitted using phase shift keying (PSK) and the frequency of the carrier signal of each symbol is arranged to be changed from symbol to symbol by hopping the carrier frequency on which the symbol is transmitted through a predetermined continuously repeating sequence of frequencies.

4. The underwater communication system of claim 3, wherein the transmitter comprises PSK modulator arranged to effectively hop the frequency of the carrier signal carrying the signal thus modulated, the receiver comprising frequency/phase detector means for detecting both of the two components of the received signals which detector is arranged to feed a correlator to which the amplitude detector is responsive for providing output signals corresponding to the data transmitted.

5. The underwater communication system of claim 4, wherein the frequency/phase detector comprises a phase quadrature detector.

6. The underwater communication system of claim 1, wherein the correlator unit of the receiver is arranged to employs optimal correlation processing of the signals and thus is arranged to continuously generates replicas of all the possible signals at each epoch in a bank of correlators, thereby to facilitate symbol recognition based on a maximum likelihood detection principle.

7. The underwater communication system of claim 1, wherein synchronisation is arranged to be achieved by transmitting a wideband header signal at the start of each signal sequence, the receiver being arranged to detect the wideband header signal.

8. The underwater communication system of claim 1, wherein a tail signal is arranged to be appended at the end of each signal sequence.

9. The underwater communication system of claim 8, wherein compensation for relative motion between the transmitter and receiver is arranged to be effected in dependence on the relative times of arrival of the head and the tail signals.

10. The underwater communication system of claim 8, wherein relative motion compensation is arranged to be implemented using time of arrival estimates of each symbol.

11. An underwater navigation system comprising the communication system of claim 1.

12. An underwater positioning system comprising the communication system of claim 1.

13. An underwater communication system comprising:
an acoustic signal transmitter; and
a remotely positioned acoustic signal receiver, wherein
data is encoded prior to transmission as a plurality of symbols each having two components one of which comprises a distinctive bit code and the other of which appertains to the character of the symbol as a whole, the character of successive symbols being stepped through a predetermined continuously repeating sequence of distinctive steps each of which occurs once in the sequence by hopping the carrier frequency on which the symbols are to he transmitted through a predetermined continuously repeating sequence of frequencies;
the distinctive bit code comprises the first component of each symbol is transmitted by the transmitter using phase shift keying (PSK); and
the signal receiver is operated synchronously with the signal transmitter and comprises a correlator unit responsive both to the bit code and to the character of received signals for effecting demodulation and having a plurality of outputs one for each symbol, so that as each symbol is detected a signal on the output to which it corresponds predominates; and
an amplitude detector responsive to the outputs from the correlator means for providing an output signal corresponding to the data transmitted; wherein
the bit code of each symbol and the character of successive symbols are changed in accordance with the predetermined sequence and synchronising operation of the transmitter and receiver.

* * * * *